United States Patent
Laine et al.

(10) Patent No.: US 9,153,068 B2
(45) Date of Patent: *Oct. 6, 2015

(54) CLIPLESS TIME AND LENS BOUNDS FOR IMPROVED SAMPLE TEST EFFICIENCY IN IMAGE RENDERING

(75) Inventors: Samuli Laine, Helsinki (FI); Tero Karras, Helsinki (FI); Jaakko Lehtinen, Helsinki (FI); Timo Aila, Helsinki (FI)

(73) Assignee: NVIDIA CORPORATION, Santa Clara, CA (US)

( * ) Notice: Subject to any disclaimer, the term of this patent is extended or adjusted under 35 U.S.C. 154(b) by 651 days.

This patent is subject to a terminal disclaimer.

(21) Appl. No.: 13/168,784

(22) Filed: Jun. 24, 2011

(65) Prior Publication Data
US 2012/0327071 A1    Dec. 27, 2012

(51) Int. Cl.
*G06T 15/00*  (2011.01)
*G09G 5/00*   (2006.01)
*G06T 15/20*  (2011.01)
*G06T 15/50*  (2011.01)
*G06T 15/30*  (2011.01)

(52) U.S. Cl.
CPC .............. *G06T 15/20* (2013.01); *G06T 15/503* (2013.01); *G06T 15/30* (2013.01)

(58) Field of Classification Search
None
See application file for complete search history.

(56) References Cited

U.S. PATENT DOCUMENTS

| | | |
|---|---|---|
| 4,897,806 A | 1/1990 | Cook et al. |
| 5,113,493 A | 5/1992 | Crosby |
| 5,222,203 A | 6/1993 | Obata |
| 5,239,624 A | 8/1993 | Cook et al. |
| 5,289,565 A | 2/1994 | Smith et al. |
| 5,299,298 A | 3/1994 | Elmquist et al. |
| 5,357,579 A | 10/1994 | Buchner et al. |
| 5,384,667 A | 1/1995 | Beckwith |
| 5,402,534 A | 3/1995 | Yeomans |
| 5,465,119 A | 11/1995 | Demos |
| 5,684,935 A | 11/1997 | Demesa, III et al. |
| 5,729,672 A | 3/1998 | Ashton |
| 5,737,027 A | 4/1998 | Demos |
| 5,809,219 A | 9/1998 | Pearce et al. |

(Continued)

FOREIGN PATENT DOCUMENTS

| | | |
|---|---|---|
| CN | 1856805 | 11/2006 |
| CN | 101599181 | 12/2009 |
| WO | 2012115711 | 8/2012 |

OTHER PUBLICATIONS

Hou, Q., et al., "Micropolygon Ray Tracing with Defocus and Motion Blur," ACM Transactions on Graphics (TOG), vol. 29, Article 64, Jul. 2010, pp. 1-10.

(Continued)

*Primary Examiner* — Ryan R Yang

(57) ABSTRACT

A method for reducing the number of samples tested for rendering a screen space region of an image includes constructing a trajectory of a primitive extending in an image which is to be rendered. A bounding volume is constructed for a screen space region of the image, the bounding volume characterized as having a bound in a non-screen space dimension which is defined as a function of the primitive's trajectory. The bounding volume is further characterized as overlapping a portion of the screen space region which is to be rendered. One or more sample points which are located within the screen space region, and which are not overlapped by the bounding volume are excluded from testing.

22 Claims, 11 Drawing Sheets

(56) References Cited

U.S. PATENT DOCUMENTS

| | | |
|---|---|---|
| 5,870,096 A | 2/1999 | Anjyo et al. |
| 5,973,700 A | 10/1999 | Taylor et al. |
| 5,982,385 A | 11/1999 | Fish et al. |
| 6,034,667 A | 3/2000 | Barrett |
| 6,211,882 B1 | 4/2001 | Pearce et al. |
| 6,300,956 B1 | 10/2001 | Apodaca et al. |
| 6,618,048 B1 | 9/2003 | Leather |
| 6,636,214 B1 | 10/2003 | Leather et al. |
| 6,700,586 B1 | 3/2004 | Demers |
| 6,707,458 B1 | 3/2004 | Leather et al. |
| 6,717,577 B1 | 4/2004 | Cheng et al. |
| 6,720,975 B1 | 4/2004 | Dietrich, Jr. |
| 6,811,489 B1 | 11/2004 | Shimizu et al. |
| 6,867,781 B1 | 3/2005 | Van Hook et al. |
| 6,885,384 B2 | 4/2005 | Deering et al. |
| 6,999,100 B1 | 2/2006 | Leather et al. |
| 7,002,591 B1 | 2/2006 | Leather et al. |
| 7,034,828 B1 | 4/2006 | Drebin et al. |
| 7,050,066 B2 | 5/2006 | Ohta |
| 7,061,502 B1 | 6/2006 | Law et al. |
| 7,075,545 B2 | 7/2006 | Van Hook et al. |
| 7,119,813 B1 | 10/2006 | Hollis et al. |
| 7,133,041 B2 | 11/2006 | Kaufman et al. |
| 7,133,047 B2 | 11/2006 | Pallister |
| 7,136,081 B2 | 11/2006 | Gritz et al. |
| 7,176,919 B2 | 2/2007 | Drebin et al. |
| 7,184,059 B1 | 2/2007 | Fouladi et al. |
| 7,187,379 B2 | 3/2007 | Keller |
| 7,196,710 B1 | 3/2007 | Fouladi et al. |
| 7,205,999 B2 | 4/2007 | Leather |
| 7,230,618 B2 | 6/2007 | Keller |
| 7,307,638 B2 | 12/2007 | Leather et al. |
| 7,307,640 B2 | 12/2007 | Demers et al. |
| 7,317,459 B2 | 1/2008 | Fouladi et al. |
| 7,362,332 B2 | 4/2008 | Gritz |
| 7,446,780 B1 | 11/2008 | Everitt et al. |
| 7,453,460 B2 | 11/2008 | Keller |
| 7,453,461 B2 | 11/2008 | Keller |
| 7,477,261 B2 | 1/2009 | Pallister |
| 7,483,010 B2 | 1/2009 | Bai et al. |
| 7,499,054 B2 | 3/2009 | Keller |
| 7,538,772 B1 | 5/2009 | Fouladi et al. |
| 7,576,748 B2 | 8/2009 | Van Hook et al. |
| 7,616,200 B1 | 11/2009 | Heinrich et al. |
| 7,623,726 B1 | 11/2009 | Georgiev |
| 7,697,010 B2 | 4/2010 | Pallister |
| 7,701,461 B2 | 4/2010 | Fouladi et al. |
| 7,742,060 B2 | 6/2010 | Maillot |
| 7,961,970 B1 | 6/2011 | Georgiev |
| 7,973,789 B2 | 7/2011 | Cook |
| 7,995,069 B2 | 8/2011 | Van Hook et al. |
| 8,098,255 B2 | 1/2012 | Fouladi et al. |
| 8,970,584 B1 | 3/2015 | Aila et al. |
| 2003/0083850 A1 | 5/2003 | Schmidt et al. |
| 2003/0234789 A1* | 12/2003 | Gritz .............................. 345/474 |
| 2006/0101242 A1 | 5/2006 | Siu et al. |
| 2007/0046686 A1 | 3/2007 | Keller |
| 2008/0001961 A1 | 1/2008 | Roimela et al. |
| 2008/0244241 A1 | 10/2008 | Barraclough et al. |
| 2009/0167763 A1 | 7/2009 | Waechter et al. |
| 2011/0090337 A1 | 4/2011 | Klomp et al. |
| 2012/0218264 A1* | 8/2012 | Clarberg et al. .............. 345/420 |
| 2012/0293515 A1* | 11/2012 | Clarberg et al. .............. 345/441 |
| 2012/0327071 A1 | 12/2012 | Laine et al. |
| 2013/0321420 A1 | 12/2013 | Laine et al. |

OTHER PUBLICATIONS

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

P. Haberli and K. Akeley, "The Accumulation Buffer: Hardware Support for High Quality Rendering," In Proc. SIGGRAPH 1990. pp. 309-318.

Tomas Akenine-Möller, Jacob Munkberg, and Jon Hasselgren, "Stochastic rasterization using time-continuous triangles," Proc. Graphics Hardware 2009.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

Moller., et al., "Stochastic Rasterization Using Time-Continuous Triangles," ACM, Jan. 2007, pp. 1-11.

Wang, Liqing; "Research on Algorithms of Computational Geometry in GIS"; China Master's Theses Full Text Database; Jan. 31, 2009.

McGuire, et al; "Hardware-Accelerated Global Illumination by Image Space Photon Mapping", HPG 2009, New Orleans, Louisiana, Aug. 1-3, 2009.

Linsen, et al; "Splat-based Ray Tracing of Point Clouds", Journal ofWSCG 15: 51-58, 2007.

Schaufler, et al; "Ray Tracing Point Sampled Geometry", In Proceedings of the Eurographics Workshop on Rendering Techniques 2000, p. 319-328, London, UK, 2000. Springer-Verlag.

* cited by examiner

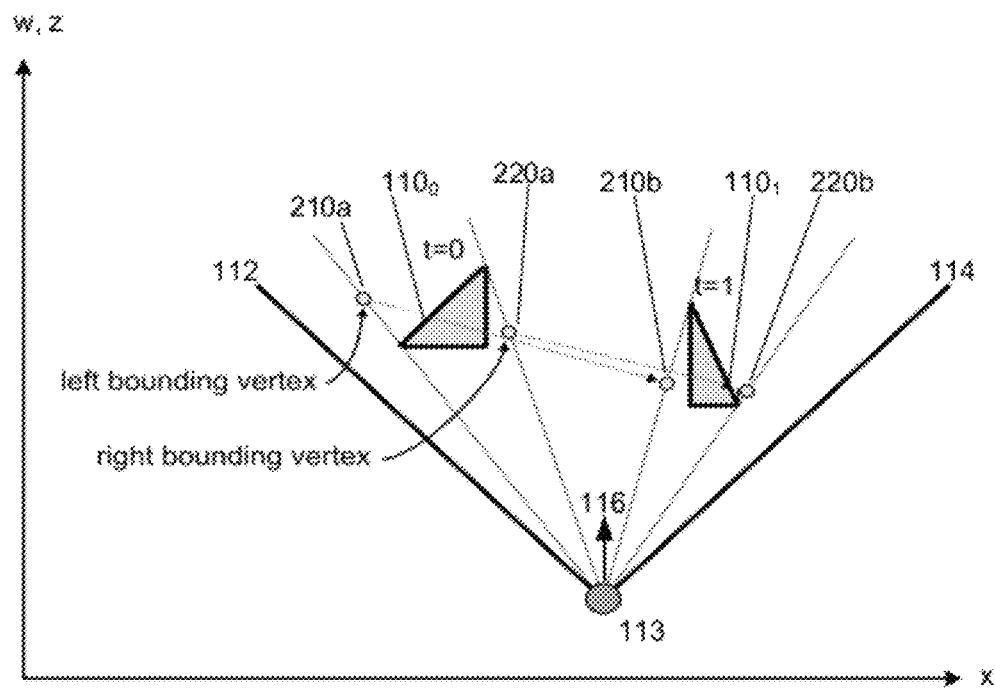
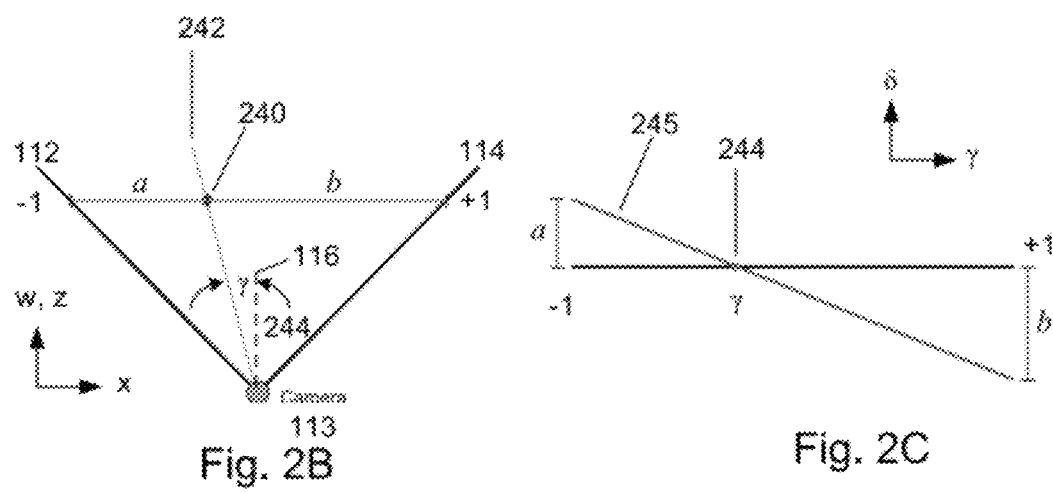

CLIPLESS TIME AND LENS BOUNDS FOR IMPROVED SAMPLE TEST EFFICIENCY IN IMAGE RENDERING

CROSS REFERENCE TO RELATED APPLICATIONS

This application is currently filed with the following commonly-owned patent applications, each of which is incorporated by reference in its entirety for all purposes:

U.S. patent application Ser. No. 13/168,765, filed Jun. 24, 2011, entitled "System and Method for Improved Sample Test Efficiency in Image Rendering,"; and U.S. patent application Ser. No. 13/168,771, filed Jun. 24, 2011, entitled "Bounding Box-Based Techniques for Improved Sample Test Efficiency in Image Rendering".

BACKGROUND

The present invention relates to image rendering, and more particularly to improving sample test efficiency in image rendering applications.

The rendering of a high quality image relies upon an accurate color computation for each pixel forming the image. The accuracy of this color computation is improved by distributing sample points across each pixel, testing which sample points are overlapped by a primitive which is to be rendered in the image, and computing a color for the pixel based upon those overlapped and non-overlapped sample points.

Sample testing algorithms (sometimes referred to as "point in polygon tests") determine which samples of a screen space region (usually a pixel) are overlapped by a primitive, and the quality of such algorithms can be based upon their "sample test efficiency" (STE), this term referring to the number of sample points overlapped by a primitive versus the number of sample points tested for a given screen space region, e.g. a pixel. A high STE indicates an efficient sample testing algorithm, as a high percentage of the test sample points were actually or possibly overlapped by the primitive.

Techniques for improving STE are useful in the contexts of motion blur and depth of field rendering effects, as both types of effects involve a primitive potentially traversing a large number of pixels, resulting in a potentially large number of sample points which have to be considered for testing.

Motion blur results when the camera and/or geometry move while the virtual camera shutter is open. While the motion can theoretically be arbitrary during the exposure of a frame, it has been observed in film industry that vertex motion can often be satisfactorily simplified by assuming linear motion between shutter open (t=0) and closed (t=1).

In stochastic rasterization, the frame buffer is generalized so that each sample has additional properties in addition to the screen-space (x,y) position. In order to support motion blur, a time value is assigned to each frame buffer sample. In absence of motion, the frame buffer behaves exactly as it does currently, providing spatial antialiasing. With motion, a sample is updated only when a triangle overlaps the sample at the time of the sample.

The prior art describes several ways of interpolating a triangle to a specified time. One approach is as described in "The Accumulation Buffer: Hardware Support for High Quality Rendering," P. Haberli and K. Akeley, Proc. SIGGRAPH 1990, pgs. 309-318, and in "Data-Parallel Rasterization of Micropolygons with Defocus and Motion Blur," K. Fatahalian, E. Luong, S. Boulos, K. Akeley, W. Mark, and P. Hanrahan, Proc. High Performance Graphics 2009. This approach involves interpolating the vertices of a primitive in homogeneous clip space before triangle setup, and therefore a separate triangle setup/rendering pass is required for each distinct time. While simple to implement, this approach may not scale to a large number of samples per pixel, and the image quality can suffer due to a fixed (typically small) set of unique time values.

A second conventional approach has been to identify the screen-space bounds for the "time-continuous triangle" (TCT) for the entire exposure time, and then test all samples in all covered pixels by interpolating the triangle to the current sample's time, as described in disclosed in "Stochastic rasterization using time-continuous triangles," T. Akenine-Möller, J. Munkberg, and J. Hasselgren, Proc. Graphics Hardware 2009. Possible implementations include at least time-continuous edge functions (about 3× the cost of traditional 2D edges) and ray-triangle intersection. TCTs offer high image quality because a unique time value can be set to each sample, but an accompanying disadvantage is low STE. When a triangle moves quickly, it can cover a relatively large region on the screen, yet at the same time we expect it to cover approximately a constant number of samples regardless of motion. STE therefore degrades drastically for fast motion, and can be as low as 1% in realistic cases.

A third approach is described in U.S. Pat. No. 4,897,806, whereby exposure time is split into several strata (typically, the number of strata equals the number of samples per pixel), and the above-mentioned second approach is called for each strata. This improves STE significantly, but the efficiency of the solution is not optimal for the low sampling densities typically encountered in fast rendering graphics (4-16 samples/pixel).

Another challenge in the rendering of images is how to process primitives which reach behind the camera plane. A possible approach for dealing with such primitives is to clip the primitive in time, producing a number of sub-spans where clipping edges are replaced by clip vertices that move across the camera plane. Unfortunately, the motion of the clip vertices is not screen-space affine, so an approximation is required for their motion, which makes it difficult if not impossible to match a reference rendering.

An additional challenge in the rendering of images is the rendering of vertices which move affinely in world space. When the vertices move affinely in world space, which is a common approximation, the resulting screen-space motion is not linear because of perspective transformation. Therefore, if linear screen-space motion was assumed, the motion-blurred image would not correspond to ground truth rendering that would be obtained by summing together a large number of images obtained at regularly spaced time instants during the frame. The difference is usually small, but when there is motion towards or away from the viewer near the camera, the results are clearly different.

In view of the shortcomings of the conventional approaches, a new method for providing improved sample test efficiency in image rendering is needed.

SUMMARY

A system, method, and computer program product for reducing the number of samples tested for rendering a screen space region of an image is presented herein. The method includes constructing a trajectory of a primitive extending in an image which is to be rendered. A bounding volume is constructed for a screen space region of the image, the bounding volume characterized as having a bound in a non-screen space dimension which is defined as a function of the primitive's trajectory. The bounding volume is further characterized as overlapping a portion of the screen space region which is to be rendered. One or more sample points which are located within the screen space region, and which are not overlapped by the bounding volume are excluded from testing.

The foregoing method finds particular application in the rendering of images, an exemplary method of which includes the aforementioned operations, and the additional operations of identifying a screen space region which is to be rendered, testing sample points which are located within the screen space region and which are overlapped by the bounding volume of the primitive, and rendering the screen space region based upon the tested sample points.

These and other features of the invention will be better understood in view of the following drawings and detailed description of exemplary embodiments.

BRIEF DESCRIPTION OF THE DRAWINGS

FIGS. 2A-2G illustrate the formation of a primitive's bounding lines and bounding vertices in accordance with the present invention;

For clarity, previously described features retain their reference indices in subsequent figures.

DETAILED DESCRIPTION OF EXEMPLARY EMBODIMENTS

The present invention describes a system and method for reducing the number of samples tested for rendering a screen space region of an image is presented herein. The system and method implement a bounding volume, exemplary an axis-aligned bounding box, which is constructed using non-screen space bounds, for example, the dimensions of t and lens coordinates u or v. The computation of these non-screen space bounds t, u, or v is described with respect to a vertex's affine motion in world/camera space, such motion translating to non-linear motion in screen space. Further particularly, the computation of the non-screen space bounds t,u,v is made such that all possible geometric configurations between the primitive and the camera are accommodated. Further exemplary, the computation of the non-screen space bounds eliminates the need for clipping, i.e. splitting the motion into multiple time intervals.

Figure 1:
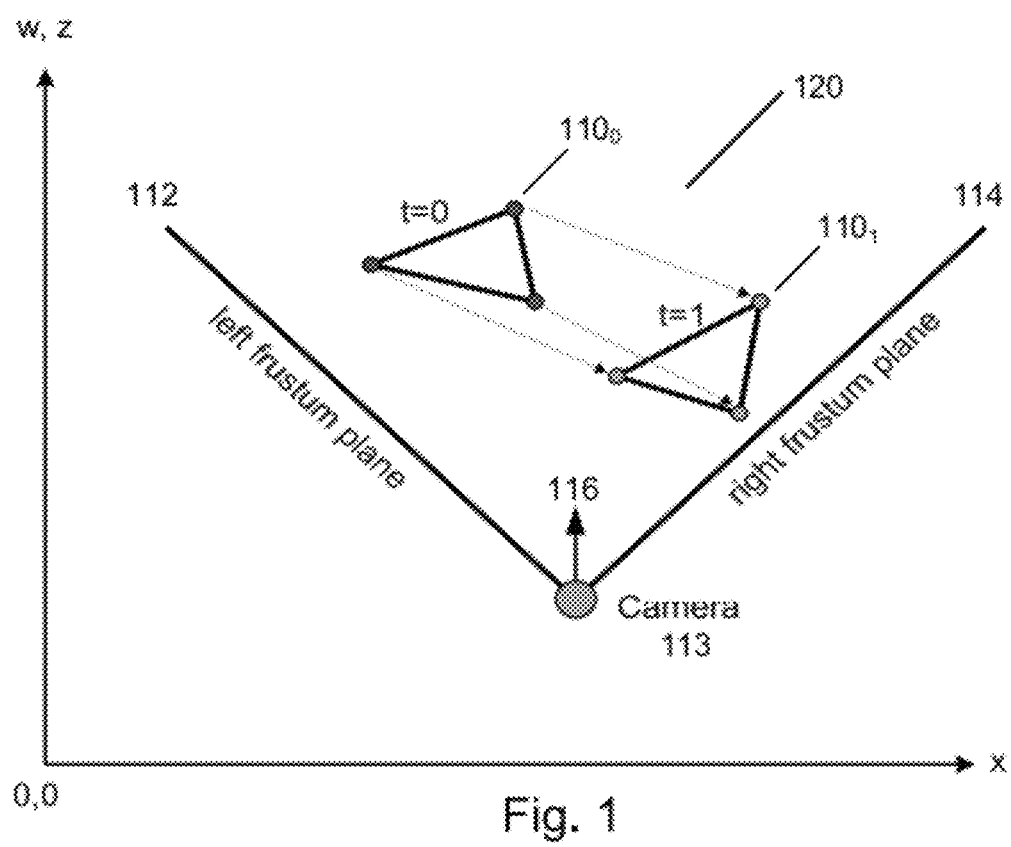
FIG. 1 illustrates motion of triangle in camera space according to one embodiment of the present invention.

FIG. 1 illustrates motion of triangle 110 in camera space according to one embodiment of the present invention. Collectively, left and right frustum planes (lines) 112 and 114 define the camera space 120 within which triangle 110 is shown as moving. The diagram assumes no depth of field, i.e. the lens is a point in space, and in this situation, there is no circle of confusion around the vertices. The horizontal axis is, e.g., the camera-space x-axis, and the vertical axis is the camera space z axis (or, in an exemplary embodiment, the w axis after the projection matrix has been applied). In the exemplary post-perspective space, each of the frustum planes 112 and 114 are diagonal at 45 degree angle from the bore sight/zero degree viewing direction 116 of camera point 113. Bounds in the x and y dimensions are treated separately, and thus calculations are performed in each of two dimensions.

Calculation of T Bounds

In accordance with the present invention, a primitive having multiple vertices is defined in camera space, and the trajectory of vertices as vertex lines is constructed in dual space as a function of viewing angle of the primitive. Bounding lines are constructed in dual space to form a bound for the vertex lines, wherein the vertex lines are contained within the bounding lines over a predefined range of viewing angles. T-bounds, i.e., $[t_{min}, t_{max}]$ corresponding to the time over which samples of the screen space region is to be tested are computed as a function of the bounding lines in dual space. The bounding volume, exemplary an axis-aligned bounding box (AABB), is then determined based upon the t-bounds. Sample points which lie within the screen space region which is to be rendered, but which are not overlapped by the AABB are excluded for testing.

Figure 2D:
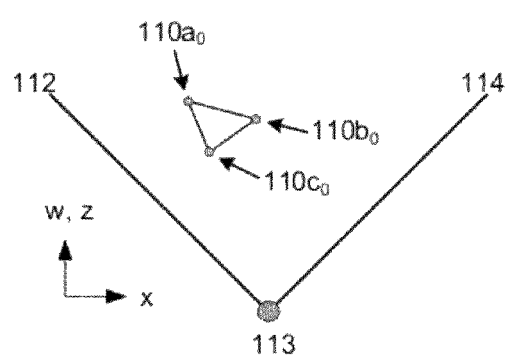

FIGS. 2A-2G illustrates the formation of a primitive's bounding lines and bounding vertices in accordance with the present invention; FIG. 2A shows the camera space trajectory of triangle 110 and its bounding vertices 210 and 220 in the (w,x) dimensions, and the (w,y) camera space dimensions would be analogous thereto. The bounding vertices 210 and 220 are defined so that they are guaranteed to lie on the left/right side of the primitive on screen at all times, as they move affinely in world space from the start to end position. In particular, the bounding vertices 210a and 220a form a bound for triangle $110_0$ at t=0 and bounding vertices 210b and 220b form a bound for triangle $110_1$ at t=1. The bounding vertices 210 and 220 are defined such that they not only bound the primitive at t=0 and t=1, but at all in-between instants along the primitive's trajectory in camera space as well.

Each bounding vertex 210 and 220 is defined using a mapping of the bounding vertex between its primary space and its corresponding dual space. As used herein, "primary space of the vertex" refers to a position in camera space, e.g., a coordinate in the (x,w) coordinate system for the x dimension of the bounding vertex shown in FIGS. 1-2C, and analogously in the (y,w) coordinate space for the y dimension of the bounding. Also as used herein, "dual space of the vertex" refers to a line in dual space corresponding to the image space position in the (x,w) or (y,w) coordinate systems. In general, a point in primary space maps to a line in dual space, and a line is primary space maps to a point in dual space.

FIGS. 2B and 2C illustrates an exemplary mapping between the primary space and dual space of a vertex. FIG. 2B illustrates vertex 240 located in the primary camera space, the vertex 240 is along a sight line 242 of camera 113. Further particularly, the sight line 242 is disposed in a projection direction/angle of (γ) 244 relative to the camera bore sight direction 116. Exemplary, projection direction (γ) 244 is normalized to extend between −1 (corresponding to the left-hand extent of the camera frustum 112) and +1 (corresponding to the right-hand extent of the camera frustum 114). The vertex 240 is disposed distance (a) away from the left-hand extent of the camera frustum 112 and distance (b) away from the right-hand extent of the camera frustum 114. Further particularly, sight line 242 in the direction of angle (γ) 244 can intersect a triangle only if the corresponding oblique projection along direction γ of the triangle onto w=0 includes the camera point. The projection of a point (x,w) is given by:

$$\gamma = x - w\gamma \quad \text{(eq. 1)}$$

FIG. 2C illustrates the dual space of the vertex 240. The horizontal axis (γ) of the dual space corresponds to image-space position (i.e. a sightline angle (γ) from the camera), and includes point 244 which is the angle (γ) of the sight line 242 from the camera bore sight 116. The vertical axis (δ) corresponds to camera-space horizontal distance between the vertex and the sight line 242. Accordingly, the slope of line 245 is determined by the distance of the vertex 240 from the camera plane, and line 245 crosses the x axis of the dual space at the point where the vertex is at the direction of the corresponding sight line 242. In this manner, line 245 represents the trajectory of the vertex 240, in dual space.

As can be understood, the trajectory representation of the vertices in dual space facilitates construction of a bounding line in dual space which represents a limit for the particular sightline 242. Such a bounding line can be mapped into primary space as a point, said point being a bounding vertex as described above.

Figure 2E:
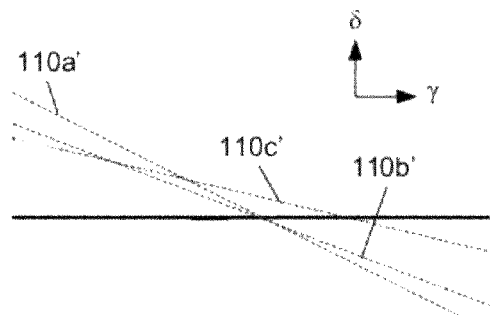
Figure 2F:
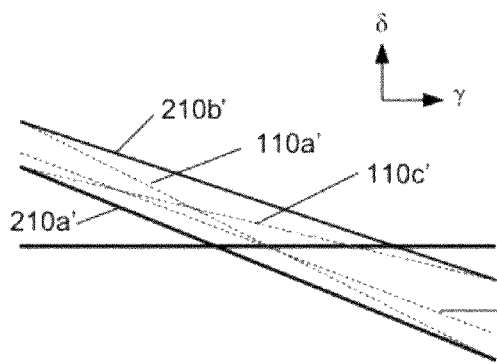
Figure 2G:
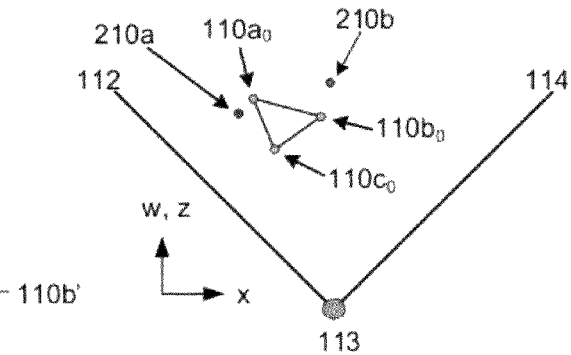

FIG. 2D illustrates triangle 110₀ including vertices 110a₀, 110b₀ and 110c₀ as shown in FIG. 1 in primary camera space. In accordance with the invention, vertices 110a₀, 110b₀ and 110c₀ of the primitive 110₀ at t=0 are mapped into dual space, and their corresponding vertex lines 110a', 110b' and 110c' are determined, as shown in. FIG. 2E. Within dual space, bounding lines 210a' and 210b' are defined to bound the vertex lines 110a', 110b' and 110c', as shown in FIG. 2F. In other words the bounding lines 210a' and 210b' are formed as limits (shown as lower and upper limits/bounds, respectively) for the vertex lines 110a', 110b' and 110c' over a portion of the dual space. The bounding lines 210a' and 210b' may be mapped from dual space into primary space, resulting in corresponding bounding vertices 210a and 210b in primary camera space, as shown in FIG. 2G. Bounding lines 210a' and 210b' represent bounds for all of the vertex lines 110a', 110b' and 110c' over the horizontal range of the dual space shown (the horizontal range corresponding to a range of projection angles δ), and correspondingly, vertices 210a and 210b in camera space will operate as respective bounds for the vertices 110a₀, 110b₀ and 110c₀ over the particular range of projection angles. The camera space affine motion of bounding vertex 210a corresponds to linear interpolation of the bounding line 210a' between t=0 and t=1, and because the interpolated bounding lines 210a' and 210b' remain on respective sides of vertex lines 110a', 110b' and 110c' (which also interpolate linearly), the bounding vertices 210a and 210b remain on their sides of the vertices 110a₀, 110b₀ and 110c₀. Further exemplary, if the projection angle range, i.e., range of viewing angles, is reduced, the bounding lines 210a' and 210b' can be made to have a smaller separation (i.e., have a smaller Euclidian distance therebetween) to provide an even smaller bounding volume/box, since outside of the desired viewing angle range the bounding lines 210a' and 210b' are not required to remain on their respective sides of the vertex lines 110a', 110b' and 110c'. The calculation of this "scissor box" is described below. Also, it can be observed that in screen-space positions where the t=0 and t=1 bounding lines lie on the same side of dual-space x axis (i.e. either above or below), only their signs are important. This allows a further narrowing of the domain where the bounding line 210a' needs to correctly approximate the vertex lines.

Figure 2H:
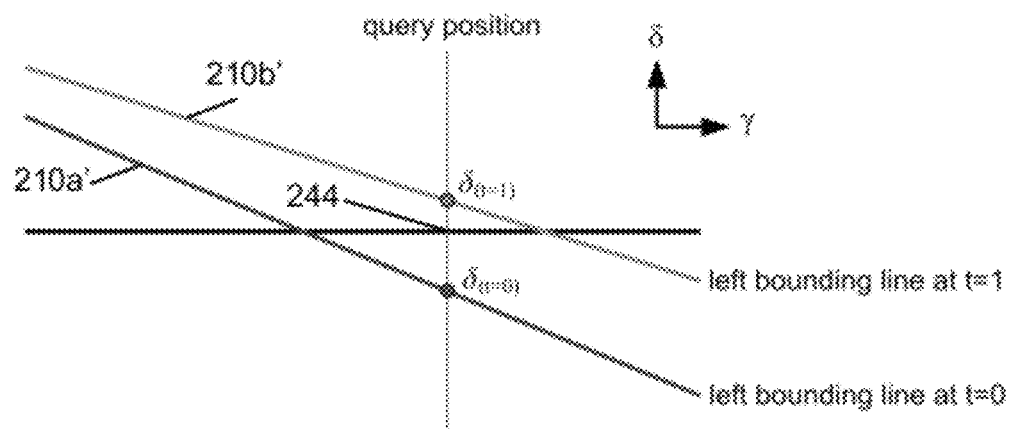
FIG. 2H illustrates the computation of T bounds as a function of the left and right bounding lines in dual space for the primitive shown in FIGS. 2A-2G.

FIG. 2H illustrates the computation of T bounds as a function of the left and right bounding lines 210a' and 210b' in accordance with the present invention. As mentioned, linear motion of the bounding vertices corresponds to linear interpolation between the corresponding bounding lines. To compute T bounds for a given point, the left bounding line for t=0 (bounding line 210a') and t=1 (bounding line 210b', computed analogously for vertices 110a₁, 110b₁ and 110c₁) are evaluated at the dual-space γ axis position corresponding to the tile/pixel in question, and the time where this linearly moving point would cross the x axis (δ=0) is solved. The following equation is exemplary:

$$t = -\delta_{(t=0)} / (\delta_{(t=1)} - \delta_{(t=0)}) \quad \text{(eq. 2)}$$

This indicates the time when the corresponding edge of the bounding box crosses the point in question. A similar calculation is performed for the right bounding line, and also for the other axis. As person skilled in the art will appreciate, $t_{min}$ and $t_{max}$ can then be determined based the resulting t-values as well the slopes of their corresponding bounding lines.

Figure 2I:
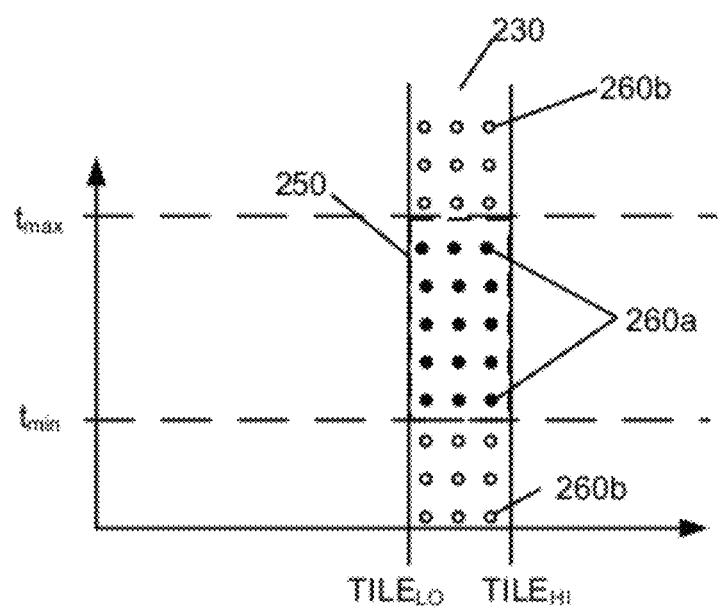
FIG. 2I illustrates the construction of a bounding volume utilizing T bounds computed in accordance with the present invention.

FIG. 2I illustrates the construction of a bounding volume utilizing the computed t-bounds of $[t_{min}, t_{max}]$ accordance with the present invention. The bounding volume 250 is formed per tile 230 (any screen space region which is to be rendered, e.g., a pixel), and extends between the tile's high and low extents/bounds $TILE_{HI}$ and $TILE_{LO}$, and the t-bounds $t_{min}$ and $t_{max}$. The bounding volume 250 is illustrated as an axis-aligned bounding volume or "bounding box" in which the extents of the bounding volume are aligned to axes of the coordinate system, shown in the time and screen space (x) dimensions. In a further particular embodiment, the bounding volume is a minimum bounding rectangle. Although not shown, the bounding volume 250 will have a corresponding representation in (y,t) coordinate system.

As shown, the bounding volume 250 will overlap a portion of the tile/screen space region 230 with the tile 230 having a plurality of sample points (260a and 260b, collectively sample points 260) distributed thereover which may be tested for intersection by the triangle 110. The number of sample points ("samples" for brevity) included within the tile 130 may be any arbitrary number, ranging from 2-128, or more and may be dependent or independent of the tile's size. In a particular embodiment, the sample density per region (e.g., number of samples per pixel) is in the range of 2-32 samples per pixel, and more particularly, 4-16 samples per pixel.

Each sample is indexed in both a screen space dimension and at least one non-screen space dimension, FIG. 2 showing samples indexed in x-dimension screen space and time dimensions. The samples 260 are distributed over space (x) and time (t), i.e., different samples have different times and different locations within the tile 230, although such samples may not be tested depending upon whether the bounding volume 250 overlaps those samples, as described below. FIG.

2 illustrates the arrangement of the samples in tile 230, but it will be understood that horizontally adjacent tiles will also include sample points.

As illustrated, the bounding volume 250 overlaps some of the samples included within the tile 130 (samples 260a, darkened), while other samples are not overlapped by the bounding volume 250 (samples 260b, undarkened). Advantageously, samples 260b which are included within the tile 130 and which are not overlapped by (i.e., not included within) the bounding volume 250 are discarded or excluded from testing, thereby improving the sample test efficiency for the tile 130.

Figure 3A:
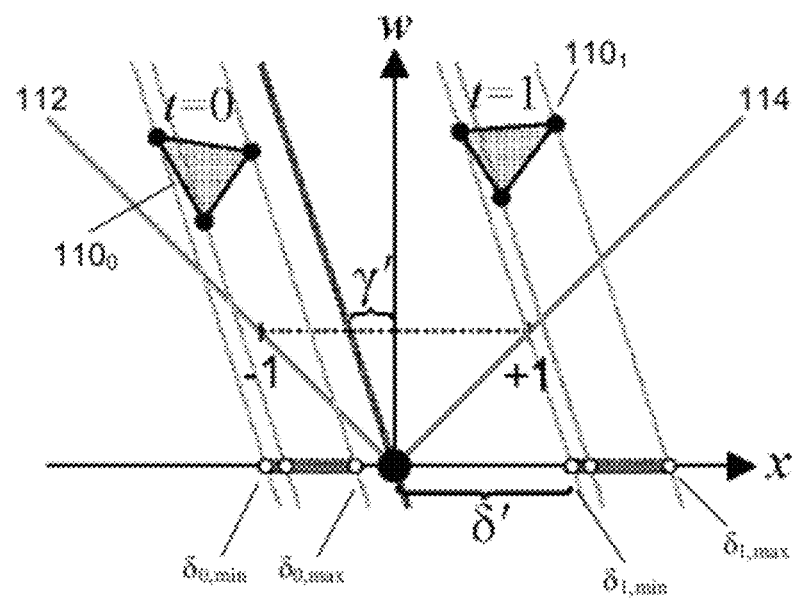
FIGS. 3A-3C illustrate a second embodiment for computing T bounds in accordance with the present invention.
Figure 3B:
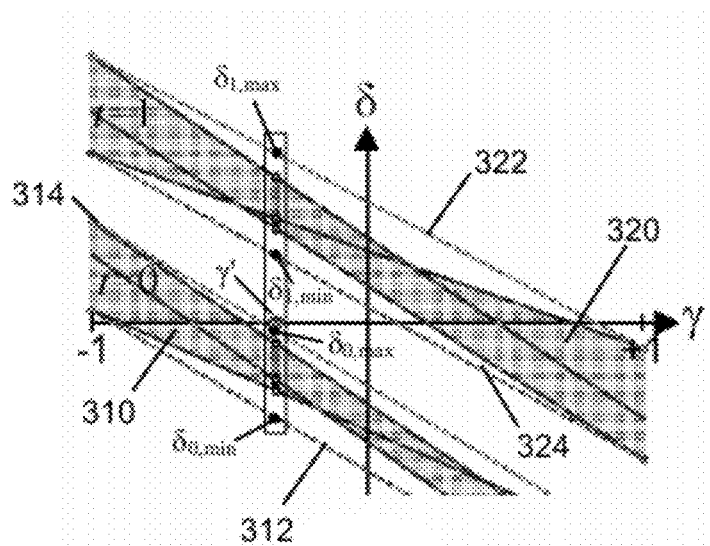
Figure 3C:
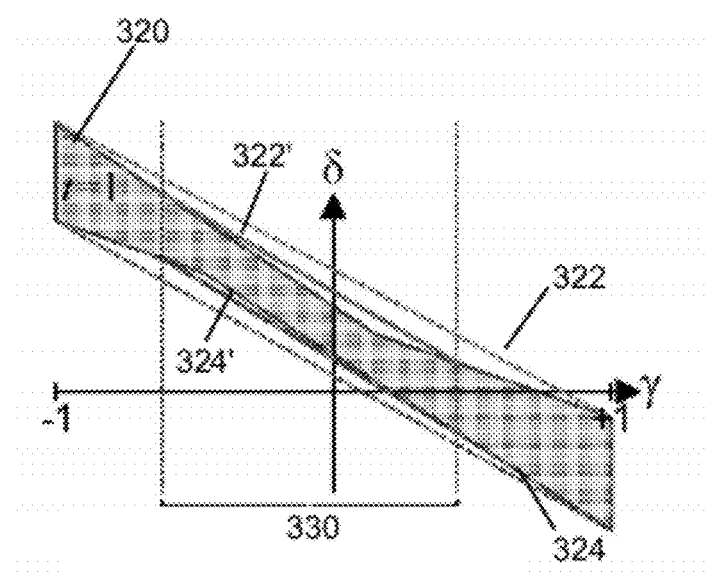

FIG. 3A-3C illustrates a second embodiment for computing T bounds in accordance with the present invention. FIG. 3A illustrates the relationship between (x,w) primary (camera) space and (γ,δ) dual space. Triangles at t=0 ($110_0$) and t=1 ($110_1$) are each projected onto w=0 line along direction y'. The positions of the projected points are denoted δ'. Extents [$δ_{t,min}$, $δ_{t,max}$] for each of t=0 and t=1 are shown. FIG. 3B illustrates the projection of the triangles $110_0$ and $100_1$ in (γ,δ) dual space. As shown, the δ of each vertex traces a linear function of γ. Projection direction γ' and the corresponding δ ranges [$δ_{t,min}$, $δ_{t,max}$] are indicated at for t=0 and for t=1. The regions 310 and 320 covered by the triangle at t=0 and t=1, respectively, are shaded, and the dashed lines 312, 314 and 322 and 324 bound these regions.

To compute T bounds for a given point in the scenario illustrated by FIG. 3, the following equations are exemplary:

$$t_{min} = -δ_{0,max}/(δ_{1,max} - δ_{0,max}) \quad (eq. 3)$$

$$t_{max} = -δ_{0,min}/(δ_{1,min} - δ_{0,min}) \quad (eq. 4)$$

The computed T bounds can be applied to construct a bounding volume (exemplary, an axis-aligned bounding box) according to the description of FIG. 2I.

FIG. 3B illustrates a projection direction extending the entire range of [+1,−1]. FIG. 3C illustrates that by restricting the projection direction γ to a limited range 330, a tighter fit (and consequently, a smaller bounding volume) can be obtained via bounding lines 322' and 324'. Only t=1 is shown for clarity.

Calculation of UV Bounds for Non-Moving Triangles

The described method can be applied to depth of field, whereby every vertex is expanded by its circle of confusion in the calculations, towards either negative or positive direction, depending on which bounding line is being constructed. As is known, a change in lens position corresponds to motion in camera space parallel with the camera plane. This motion is affine in the sense that linearly changing U produces affine screen-space motion in X, and similarly for V and Y.

Figure 4A:
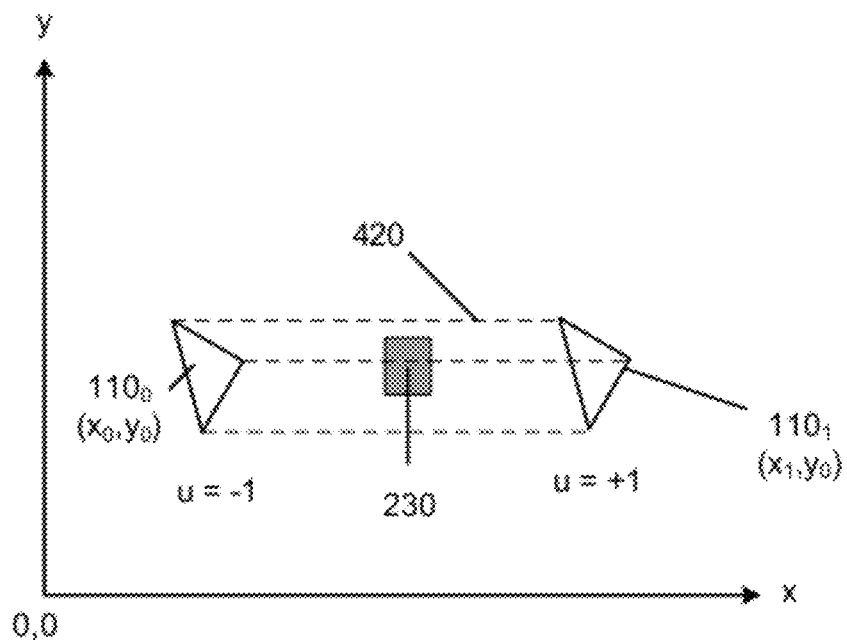
FIGS. 4A and 4B illustrate a triangle exhibiting apparent motion in screen space as a function of horizontal lens dimension (u) in accordance with the present invention.
Figure 4B:
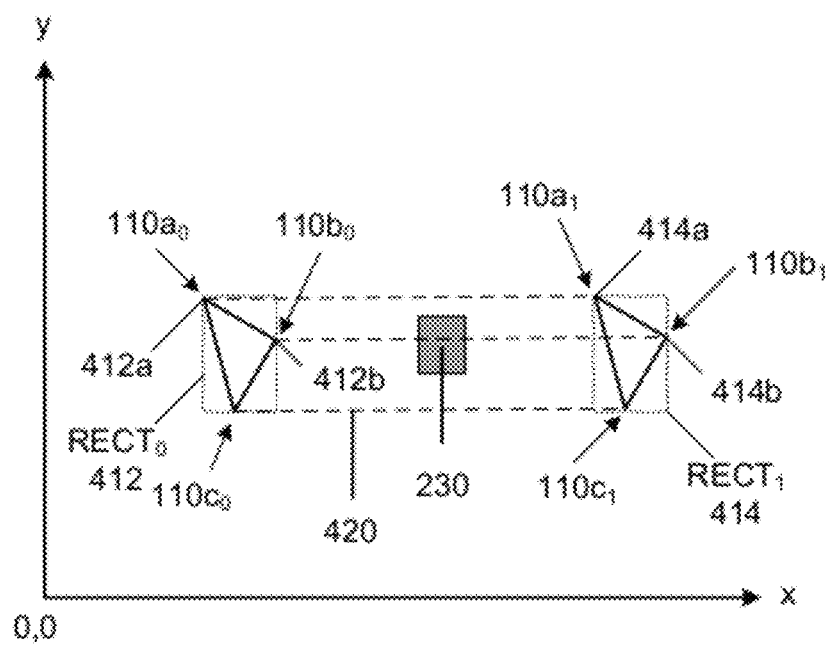

FIGS. 4A and 4B illustrates a triangle exhibiting apparent motion in screen space as a function of horizontal lens dimension (u) in accordance with the present invention. FIGS. 4A and 4B both illustrate the same triangle, although different features are illustrated in each for greater clarity. Triangle 110 is shown at each of two x-positions ($x_0$) and ($x_1$) relative to two different horizontal lens positions u=−1 and u=+1, the triangle 110 identified with the references $110_0$ and $110_1$ to indicate their respective lens positions. The motion of the triangle is "apparent" in this instance, as the triangle does not actual move in time, but rather its position is shifted, depending upon the lens position (u) from which it is viewed. Further particularly, the triangle 110 exhibits a trajectory 420 which intersects the screen space region/tile 230 over some range of the horizontal lens dimension (u) which is to be solved.

Bounding structures (illustrated in the form of bounding rectangles) $RECT_0$ and $RECT_1$ 412 and 414 are used to approximate respective triangles $110_0$ and $110_1$. Each of the bounding rectangles $RECT_0$ 412 and $RECT_1$ 414 includes low (LO) and high (HI) extents (points) for the x plane, these extents corresponding to the afore-described minimum and maximum vertices, the low and high extents used in forming the primitive's trajectory 420, as described herein. For the x-plane, $RECT_0$ has a low extent 412a corresponding to (i.e., which approximates) the minimum x-plane vertex $110a_0$, and a high extent 412b corresponding to maximum x-plane vertex $110b_0$. Similarly, $RECT_1$ has a low extent 414a corresponding to the minimum x-plane vertex $110a_1$, and a high extent 414b corresponding to maximum x-plane vertex $110b_1$. Although the same vertex of the triangle 110 serves as the basis for the low extents 412a, 414a at each of the lens positions u=−1 and u=+1 (i.e., vertex 110a for the low side and vertex 110b for the high side), this is not necessarily the case, e.g. if the vertices are located at different depths, as seen from the camera. Analogously, for a primitive exhibiting apparent motion in screen space as a function of vertical lens dimension (v), the $RECT_0$ and $RECT_1$ would have low and high extents in the y-direction. The bounding structure which approximates the triangle may be of any geometry, e.g., a triangle, including a triangle as described in the Applicant's aforementioned concurrently-filed U.S. patent application Ser. No. 13/168,771, filed Jun. 24, 2011, entitled "Bounding Box-Based Techniques for Improved Sample Test Efficiency in Image Rendering,". Generally, the approximating bounding structure may be any polygon in accordance with the present invention.

Figure 5A:
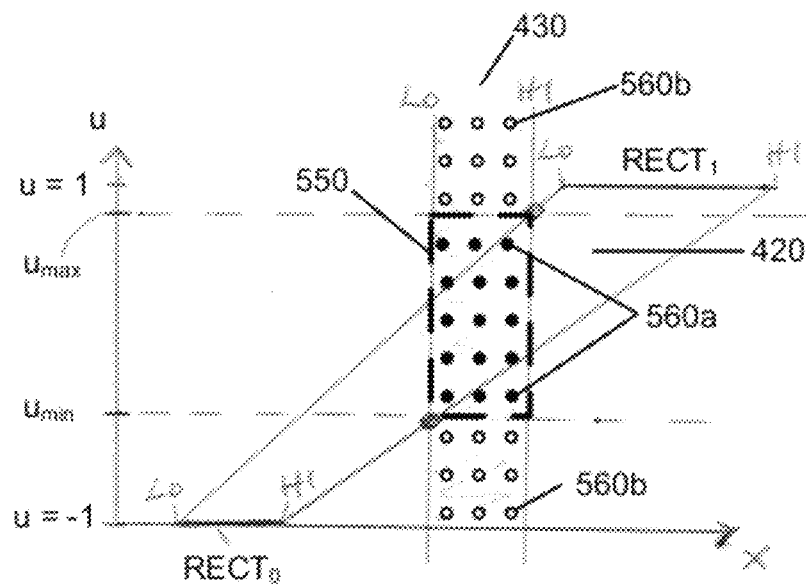
FIGS. 5A and 5B illustrate a bounding volume as a function of the horizontal and vertical lens dimension (u) and (v), respectively, in accordance with the present invention.
Figure 5B:
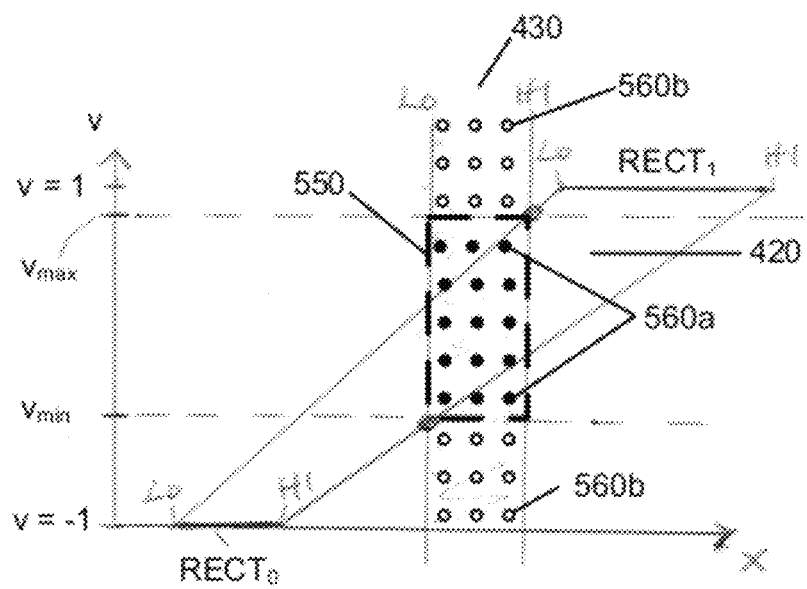

FIGS. 5A and 5B illustrate the bounding volume 550 as a function of the horizontal and vertical lens dimension (u) and (v), respectively, in accordance with the present invention. The screen space region or "tile" 430 includes samples 560 (collectively, samples 560a and 560b) which may be tested. The samples 560 are arranged corresponding to different lens positions (u) or (v), i.e., different samples are available for testing when viewed for different lens positions (u) or (v) and at different locations within the tile 430. The samples are described as "available for testing," since one or more of the samples may not be tested, depending upon whether the bounding volume 550 overlaps those samples, as described below. Horizontal and vertical lens dimensions (u) and (v) extend along their respective axes between minimum and maximum values +1 to −1, as is the convention in the industry.

In FIG. 5A, the bounding volume is formed per tile 430 and includes screen space bounds $TILE_{LO}$ and $TILE_{HI}$ and the non-screen space bounds of $u_{min}$ and $u_{max}$ corresponding to the horizontal lens dimension coordinates. Similarly, the bounding volume of FIG. 5B is formed per tile 430, that bounding volume including screen space bounds $TILE_{LO}$ and $TILE_{HI}$ for tile 430 and the non-screen space bounds of $v_{min}$ and $v_{max}$ corresponding to the vertical lens dimension coordinates which produces apparent motion of the triangle. The computation of $u_{min}/u_{max}$ and $v_{min}/v_{max}$ can be according to the equations:

$$u_{min}/v_{min} = (TILE_{LO} - RECT_{0,HI})/(RECT_{1,HI} - RECT_{0,HI}) \quad (eq. 5)$$

$$u_{max}/v_{max} = (TILE_{HI} - RECT_{0,LO})/(RECT_{1,LO} - RECT_{0,LO}) \quad (eq. 6)$$

As illustrated, the bounding volume 550 overlaps some of the samples included within the tile 430 (samples 560a, darkened), while other samples are not overlapped by the bounding volume 550 (samples 560b, undarkened). In this embodiment, and the primitive overlaps or extends over the region from apparent motion of the primitive. Advantageously, samples 560b which are included within the tile 430 and which are not overlapped by the bounding volume 550 are discarded or excluded from testing, thereby improving the sample test efficiency for the tile 430.

Calculation of UV Bounds for Moving Triangles

Figure 6A:
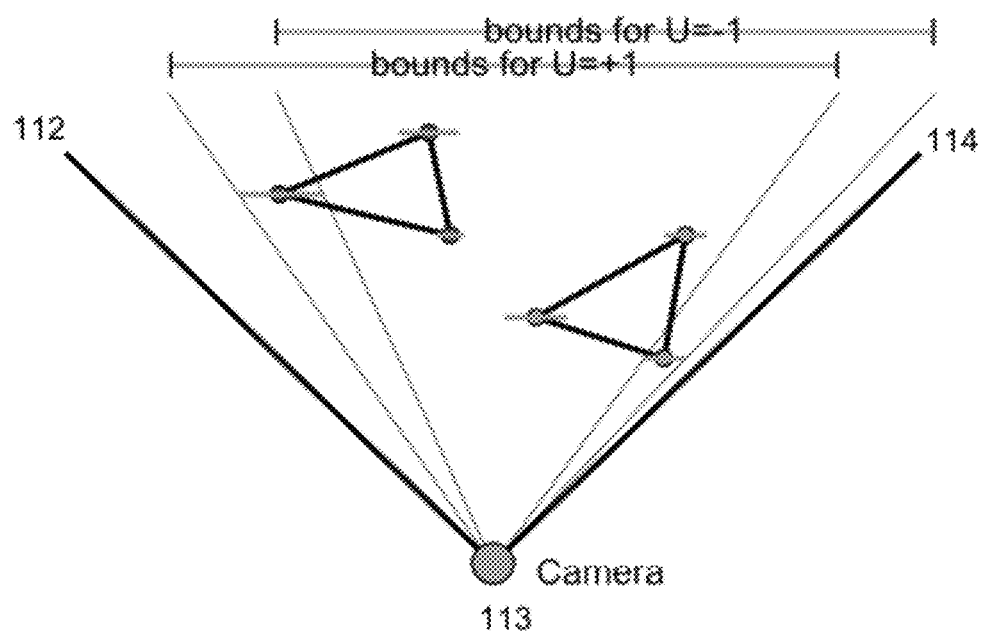
FIG. 6A illustrates exemplary bounds calculated for extreme positions on lens in the x image space coordinate and its corresponding u lens space coordinates in accordance with the present invention.

FIG. 6A illustrates exemplary bounds calculated for extreme positions on lens in the x image space coordinate and its corresponding u lens space coordinates in accordance with the present invention. In the figure, each vertex of the triangle at t=0 and t=1 is accompanied by a circle of confusion (CoC). Each vertex may have the same or different CoCs, and each CoC is assumed to interpolate linearly in time for the same vertex. CoC is usually defined in screen space, but it can be easily taken to camera space by multiplying with distance to camera plane. The goal is to produce two bounding boxes, one for U=−1 and one for U=+1, that encompasses all vertices during the entire frame time. For vertices that are in front of the camera plane, the CoCs are projected into screen space and the corresponding bounding volumes/boxes calculated, as shown.

Vertices behind the camera plane may cause some or all of the bounds to be extended to infinity. In order to detect when this should be done, we test if the convex hull of the vertices crosses the left or right frustum planes 112 and 114.

Figure 6B:
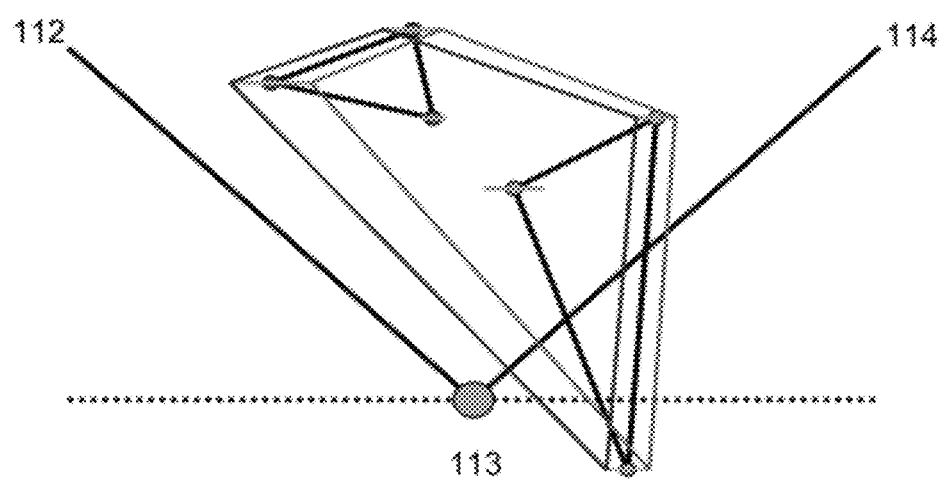
FIG. 6B illustrates an exemplary embodiment of a convex hull crossing the right frustum plane in accordance with the present invention.

FIG. 6B illustrates an exemplary embodiment of a convex hull crossing the right frustum plane 114 in accordance with the present invention. In this example, both the U=−1 and U=+1 bounding boxes should be extended to infinity on the right, because the convex hulls of both intersect the right frustum plane 114 on the right hand side of the camera 113. When either the U=−1 or U=+1 bound is extended to infinity on e.g. right side, that edge of the bounding box is ignored when determining the U bounds for a given point.

Construction of the convex hull of the vertices for this operation is not required, as only a binary result of intersection versus non-intersection is needed. Accordingly, it is sufficient to perform a linear scan over the vertices and maintain a candidate separating line between the vertices and the frustum plane (half-line). Intersection is exemplary detected by impossibility of finding a consistent separating line.

Calculation of Time and Screen Space Scissors

To determine the U bounds for a given point, the methods as described herein are performed, taking the bounding boxes for U=−1 and U=+1 and solving the U span where the linearly transforming box covers the point. For efficiency, the divisions involved can be pre-calculated so that the computation only involves multiplies and additions. Bounds for V are computed similarly.

In order to rasterize the primitive, a screen-space bounding rectangle is needed that limits the number of pixels or tiles that need to be enumerated. In an exemplary embodiment, this screen-space scissor rectangle is constructed by taking the union of the U/V=−1 and U/V=+1 bounding boxes. The scissor rectangle is then used as an initial interval when fitting the bounding lines, as described in FIGS. 3-5C as applied to the computation of u- and v-bounds.

In addition to screen-space scissors, it is useful to compute time scissor for the primitive. This enables the culling of time instants where the primitive is completely outside the frustum. Due to the described projectionless bound construction, a primitive that is behind the camera may appear to have non-empty bounds on screen. By restricting the possible T bounds to the time scissor, these false bounds can be efficiently removed.

In one embodiment, the time scissor is computed by calculating the extents of the primitive at t=0 and t=1 with respect to frustum's four side planes and the camera plane. From these extents, the T span during which the primitive may be inside frustum is calculated.

It is to be noted that the calculation of screen-space and time scissors can be adapted to account for tile extents. For T bounds, tile extents can be handled by enlarging the circles of confusion appropriately. For UV bounds, the bounding boxes can be enlarged by the tile extents.

Figure 7:
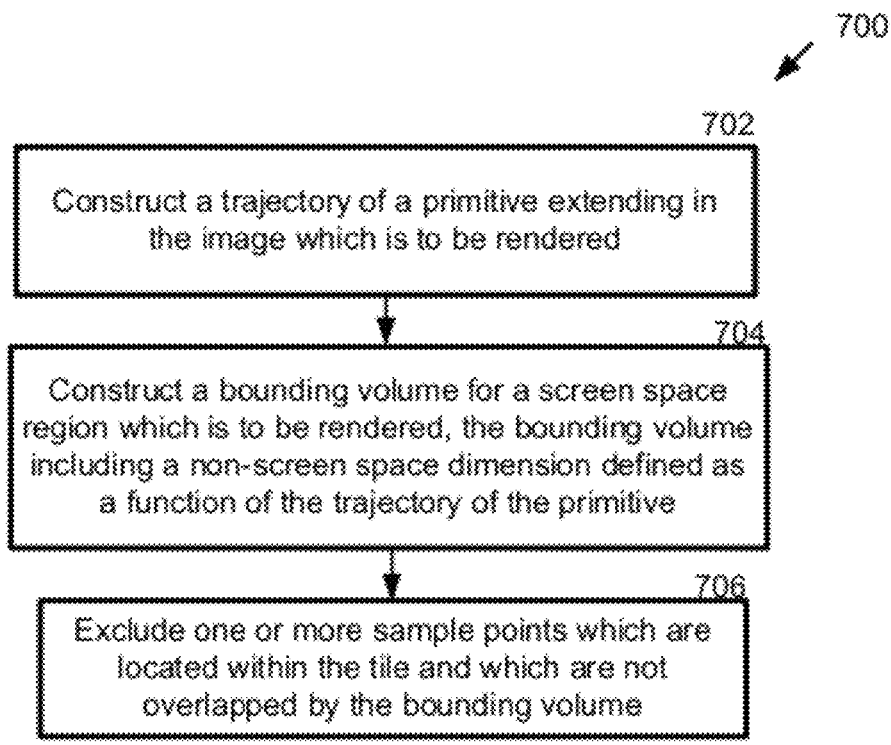
FIG. 7 illustrates an exemplary method for reducing the number of samples tested for rendering a region of an image in accordance with the present invention.

FIG. 7 illustrates an exemplary method 700 for reducing the number of samples tested for rendering a region of an image in accordance with the present invention. At 702, a trajectory is constructed for a primitive which extends in an image which is to be rendered. At 704, a bounding volume is constructed which overlaps a portion of a screen space region which is to be rendered. The bounding volume is characterized as having a non-screen space bound (e.g., $t_{min}$, $t_{max}$, $u_{min}$, $u_{max}$, $v_{min}$, $v_{max}$) which is computed as a function of the trajectory of the primitive. At 706, one or more sample points which are located within the screen space region, and which are not overlapped by the bounding volume are excluded from testing.

Exemplary of method 700 in which the rendering of a time-based effect (e.g., motion blur) is sought with fewer sample points requiring testing, operation 702 is exemplified by constructing a trajectory of a plurality of the primitive's vertices in camera space as shown in FIGS. 2A-2I. Exemplary of operation 704 in this embodiment, each of a plurality of vertices of the primitive is mapped from camera space to dual space in which each vertex is represented as a vertex line, whereby a plurality of vertex lines are generated. The plurality of vertex lines are bound in dual space with first and second bounding lines, and t-bounds [$t_{min}$,$t_{max}$] are computed therefrom. The t-bounds are used to generate a bounding volume, an example of which is shown in FIG. 2I. Exemplary of operation 706 in this embodiment, the sample points where are included within the screen space region which is to be rendered, and which are not overlapped by the bounding volume are excluded from testing in the rendering of the screen space image.

Exemplary of method 700 in which the rendering of a spatial-based effect (e.g., defocus/depth of field) is sought with fewer sample points requiring testing, operation 702 is exemplified by constructing a trajectory of a plurality of the primitive's vertices in screen space as shown in FIGS. 4A and 4B. In particular, first and second screen space positions of the primitive at respective first and second lens positions (u,v) are determined, and a screen space trajectory extending between the first and second screen space positions is constructed. Exemplary of operation 704 in this embodiment, the bounding volume is constructed by determining minimum and maximum bound in the u/v lens dimension as a function of the trajectory's screen space points, and forming a bounding volume which extends between those minimum and maximum bounds in the non-screen space dimension and between the predefined bounds of the screen space dimension. In a specific embodiment, the non-screen space bounds of the bounding volume are computed according to equations 5 and 6, above. The u/v-bounds are used to generate a bounding volume, examples of which are shown in FIGS. 5A and 5B. Exemplary of operation 706 in this embodiment, the sample points where are included within the screen space region which is to be rendered, and which are not overlapped by the bounding volume are excluded from testing in the rendering of the screen space image.

As exemplified in the description of FIGS. 2I and 5B, the bounding volume includes a non-screen space dimension (t), (u), or (v) and a screen space dimension (x) or (y), the latter having predefined bounds (shown as $TILE_{LO}$ and $TILE_{HI}$ in FIG. 2). Exemplary of operation 704, the bounding volume is constructed by determining minimum and maximums bound in the non-screen space as a function of the trajectory, and forming a bounding volume which extends between those minimum and maximum bounds in the non-screen space dimension and between the predefined bounds of the screen space dimension. In a specific embodiment, the non-screen space bounds of the bounding volume are computed according to equations 2-4 for computing t-bounds [$t_{min}, t_{max}$] and equations 5 and 6 for computing u-bound [$u_{min}, u_{max}$] and v-bounds [$v_{min}, v_{max}$].

Further exemplary of 704, a viewing angle is defined from a predefined camera point. Also, a minimum camera plane dimension (delta min) and a maximum camera plane dimension (delta max) are identified at said viewing angle. An axis-aligned bounding box is determined as a function of the minimum and maximum camera plane dimensions, as set forth in the description of FIGS. 3A and 3B.

Exemplary of operation 706, a determination is made as to which samples within the tile are overlapped with the bounding volume, and excluding those sample not overlapped from testing. In a particular embodiment of this operation, the samples are arranged within the tile with increasing time, or lens dimensions (u,v), thus defining an area with increasing screen and non-screen space dimensions. The bounding volume also describes an area with an increasing screen and non-screen space dimensions for the trajectory of the primitive. The overlap of these two areas represents the samples which are possibly traversed by the triangle. Samples outside of this overlapped area are excluded from testing.

Exemplary, the method 700 is carried out for each of a plurality of primitives in order to improve the sample test efficiency for determining the color/transparency/reflectance of a tile (e.g., a pixel) which is overlapped by the plurality of primitives. Further exemplary, multiple primitives overlapping a particular tile/pixel may be processed in parallel, whereby multiple instances of operations 702 and 704 (one instance for each primitive) are carried out concurrently.

In an exemplary application, the method of FIG. 7 is carried out as a part of a graphics pipeline process, e.g., as a part of a pixel shader program executed to compute the color/transmittance/reflectance of the screen space region, e.g., a fragment or a pixel. Execution time of the shader program is shortened due to the smaller number of samples tested, and as such the shader is able to compute the pixel's color faster without loss of accuracy. Further exemplary, the operations described in FIG. 7 may be performed in hardware, using e.g., an application specific integrated circuit (ASIC) or other circuit which is able to be configured to carry out the describe operations.

Figure 8:
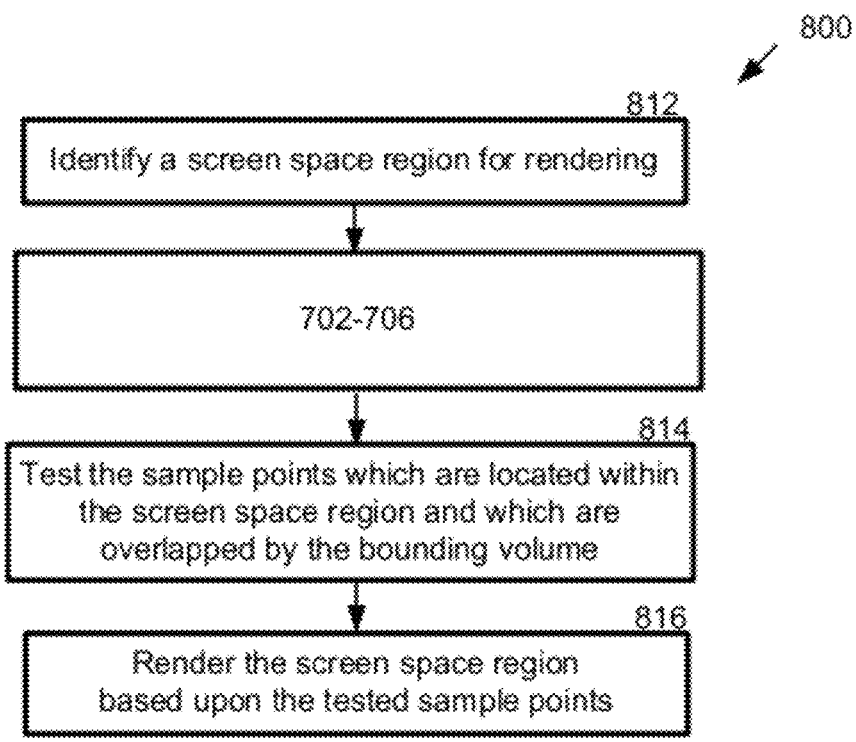
FIG. 8 illustrates an exemplary method for rendering a region of an image in accordance with the present invention.

FIG. 8 illustrates a method for rendering a region of an image which incorporates method 700. At 812, a screen space region which is to be rendered is identified. The method 800 continues with the implementation of operations 702, 704 and 706 as described, and implemented in accordance with one or more of the exemplary embodiments described herein. At 814, the samples which are located within the screen space region, and which are overlapped by the bounding volume of the primitive are tested. At 816, the screen space region of the image is rendered based upon the tested samples. Exemplary embodiments of operation 816 include implementing a shader program operable to compute the color/transmittance/reflectance of the screen space region based upon the tested samples within that region and overlapped by the bounding volume. Further exemplary, the method 800 is repeated one or more times to render multiple regions of the image or the entire image. As used herein, the term "render" refers to the output of the screen space region/image in a visually comprehensible format (e.g., displayed on a monitor, printed on a medium, etc.), as well as the process of storing the data corresponding to such a region/image in electronic form, e.g. in a render target, such as a frame buffer.

Figure 9:
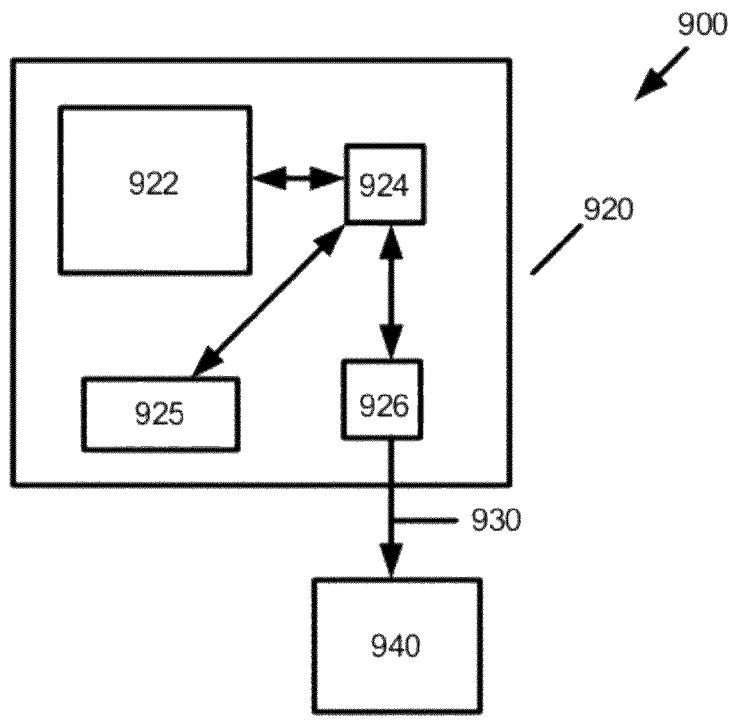
FIG. 9 illustrates an exemplary system in which the methods described for FIGS. 1A-8 finds utility in accordance with the present invention.

FIG. 9 illustrates an exemplary system 900 in which the methods described for FIGS. 1A-8 finds utility in accordance with the present invention. The system 900, exemplary a computer system, includes a graphics processing sub-system 920 and an output device 940, such as a monitor or printer. The graphics processing sub-system 920 includes a processor 922, a memory interface 924, a frame buffer 925, and a scanout processor 926. The processor 922 is operable to perform any or all of the operations described for FIGS. 1A-8 herein, and is a parallel processing architecture in an exemplary embodiment. A frame buffer 926 is operably coupled to the processor 922 for receiving rasterized and/or raytraced fragment values for each frame, and for reading out a composite image of each frame to the output device 940 via memory interface 924 and link 930 (e.g., a DVI link). In a specific embodiment, the processor 922 is operable to carry out one, several, or all of the operations described for any one, several or more of FIGS. 1A-8. Further, the processor 922 may include local memory operable to store instruction code for performing the methods described in FIGS. 1A-8. In an alternative embodiment, system 900 may take on different forms (e.g., a personal digital assistant, an internet device, a mobile telephone, or other mobile device), and processor 920 may be an embedded in such different systems. Further alternatively, the processor 922 may take the form of an application specific integrated circuit or other hardware/firmware circuit operable to carry out the operations described for any one, several, or all of FIGS. 1A-8.

In one embodiment, system 900 is operable to reduce the number of samples tested for rendering a region of an image in accordance with the present invention. In this embodiment, the system 900 includes a processor 922 operable to perform one or more of the operations described for FIG. 7, and one or more of the operations described for FIG. 8.

As readily appreciated by those skilled in the art, the described processes and operations may be implemented in hardware, software, firmware or a combination of these implementations as appropriate. In addition, some or all of the described processes and operations may be carried out as a computer-implemented method, or as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

In a particular embodiment of the invention, a memory (which may be included locally within the processor 922 or globally within system 900) is operable to store instructions for performing any of the operations described for FIGS. 1A-8. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

Figure 10:
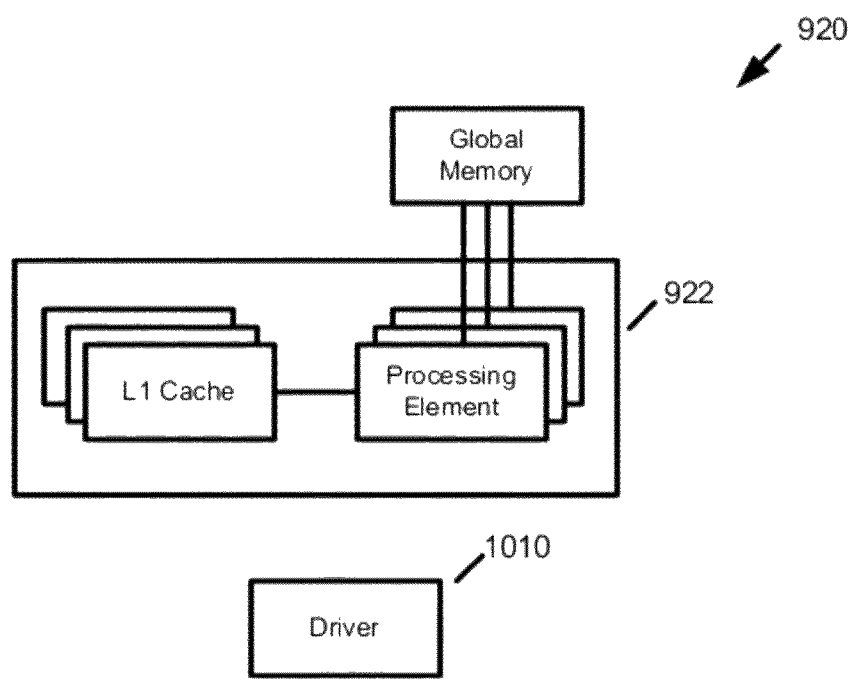
FIG. 10 illustrates an exemplary graphics processing subsystem shown in FIG. 8 in accordance with the present invention.

FIG. 10 illustrates an exemplary graphics processing sub-system 920 of FIG. 9 in accordance with the present invention. The graphics processing sub-system 920 includes parallel processing elements and their associated local L1 caches, as well as a global memory block which is operable to store instructions for carrying out the methods described for FIGS. 1A-8. The sub-system 920 may further include one or more drivers 1010 for controlling the operation of the subsystem 920 in accordance with the methods described herein. In one embodiment, the sub-system 920 is included within in a graphics card. In another embodiment, the sub-system 920 is included within the motherboard of a computer or workstation or on a game console. In another embodiment, the sub-system 920 is realized in an embedded system, such as in a cellular telephone.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for reducing the number of sample points tested for rendering a screen space tile of an image, the method comprising:
   constructing a trajectory for a primitive extending within an image which is to be rendered;
   determining low and high bounds in a non-screen space dimension for the screen space tile of the image which is to be rendered by using points of the trajectory of the primitive;
   constructing a bounding volume for the screen space tile of the image which is to be rendered by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile; and
   excluding from testing, one or more sample points which are located within the screen space tile, and which are not overlapped by the bounding volume.

2. The method of claim 1,
   wherein said constructing a trajectory comprises constructing the trajectory of the primitive in camera space of the image which is to be rendered, and
   wherein said constructing a bounding volume comprises constructing an axis-aligned bounding box for the screen space tile, the axis-aligned bounding box having a minimum bound and a maximum bound in the time dimension which are defined as a function of the camera space trajectory of the primitive.

3. The method of claim 2, wherein said constructing a bounding volume further comprises:
   mapping each of a plurality of vertices of the primitive from camera space to dual space in which each vertex is represented as a vertex line, whereby a plurality of vertex lines are generated;
   forming a plurality of bounding lines which limit the vertex lines over a portion of the dual space; and
   computing the minimum and maximum bounds in the time dimension as a function of the bounding lines.

4. The method of claim 1,
   wherein said constructing a trajectory comprises constructing the trajectory of the primitive in screen space of the image which is to be rendered, and
   wherein said constructing a bounding volume comprises constructing an axis-aligned bounding box for the screen space tile, the axis-aligned bounding box having a minimum bound and maximum bound in a lens dimension (u,v) which are defined as a function of the screen space trajectory of the primitive.

5. The method of claim 4, wherein said constructing a trajectory comprises:
   determining first and second screen space positions of the primitive at respective first and second lens positions (u,v); and
   constructing a screen space trajectory extending between the first and second screen space positions of the primitive.

6. A method for rendering a screen space tile of an image, comprising:
   identifying a screen space tile which is to be rendered;
   constructing a trajectory for a primitive in the screen space tile;
   determining low and high bounds in a non-screen space dimension for the screen space tile by using points of the trajectory of the primitive;
   constructing a bounding volume for the screen space tile by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile;
   excluding from testing, one or more sample points which are located within the screen space tile, and which are not overlapped by the bounding volume;
   testing the sample points which are located within the screen space tile and which are overlapped by the bounding volume; and
   rendering the screen space tile of the image based upon the tested sample points.

7. The method of claim 6,
   wherein said constructing a trajectory comprises constructing the trajectory of the primitive in camera space of the image which is to be rendered, and
   wherein said constructing a bounding volume comprises constructing an axis-aligned bounding box for the screen space tile, the axis-aligned bounding box having a minimum bound and a maximum bound in the time dimension which are defined as a function of the camera space trajectory of the primitive.

8. The method of claim 7, wherein said constructing a bounding volume further comprises:
mapping each of a plurality of vertices of the primitive from camera space to dual space in which each vertex is represented as a vertex line, whereby a plurality of vertex lines are generated;
forming a plurality of bounding lines which limit the vertex lines over a portion of the dual space; and
computing the minimum and maximum bounds in the time dimension as a function of the bounding lines.

9. The method of claim 6,
wherein said constructing a trajectory comprises constructing the trajectory of the primitive in screen space of the image which is to be rendered, and
wherein said constructing a bounding volume comprises constructing an axis-aligned bounding box for the screen space tile, the axis-aligned bounding box having a minimum bound and maximum bound in a lens dimension (u,v) which are defined as a function of the screen space trajectory of the primitive.

10. The method of claim 9, wherein said constructing a trajectory comprises:
determining first and second screen space positions of the primitive at respective first and second lens positions (u,v); and
constructing a screen space trajectory extending between the first and second screen space positions of the primitive.

11. A system operable to reduce the number of sample points tested for rendering a screen space tile of an image, the system including a processor operable to:
construct a trajectory for a primitive extending within an image which is to be rendered;
determine low and high bounds in a non-screen space dimension for the screen space tile of the image which is to be rendered by using points of the trajectory of the primitive;
construct a bounding volume for the screen space tile of the image which is to be rendered by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile; and
exclude from testing, one or more sample points which are located within the screen space tile, and which are not overlapped by the bounding volume.

12. The system of claim 11,
wherein processor operation to construct a trajectory further includes constructing the trajectory of the primitive in camera space of the image which is to be rendered, and
wherein processor operation to construct a bounding volume further includes constructing an axis-aligned bounding box for the screen space tile, the axis-aligned bounding box having a minimum bound and a maximum bound in the time dimension which are defined as a function of the camera space trajectory of the primitive.

13. The system of claim 12, wherein processor operation to construct a bounding volume further includes:
mapping each of a plurality of vertices of the primitive from camera space to dual space in which each vertex is represented as a vertex line, whereby a plurality of vertex lines are generated;
forming a plurality of bounding lines which limit the vertex lines over a portion of the dual space; and
computing the minimum and maximum bounds in the time dimension as a function of the bounding lines.

14. The system of claim 11,
wherein processor operation to construct a trajectory further includes constructing the trajectory of the primitive in screen space of the image which is to be rendered, and
wherein processor operation to construct a bounding volume further includes constructing an axis-aligned bounding box for the screen space tile, the axis-aligned bounding box having a minimum bound and maximum bound in a lens dimension (u,v) which are defined as a function of the screen space trajectory of the primitive.

15. The system of claim 14, wherein processor operation to construct a trajectory further includes:
determining first and second screen space positions of the primitive at respective first and second lens positions (u,v); and
constructing a screen space trajectory extending between the first and second screen space positions of the primitive.

16. A system operable to render a screen space tile of an image, the system including a processor operable to:
identify a screen space tile which is to be rendered;
construct a trajectory for a primitive in the screen space tile;
determine low and high bounds in a non-screen space dimension for the screen space tile by using points of the trajectory of the primitive;
construct a bounding volume for the screen space tile by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile;
exclude from testing, one or more sample points which are located within the screen space tile, and which are not overlapped by the bounding volume;
test the sample points which are located within the screen space tile and which are overlapped by the bounding volume; and
render the screen space tile of the image based upon the tested sample points.

17. The system of claim 16,
wherein processor operation to construct a trajectory further includes constructing the trajectory of the primitive in camera space of the image which is to be rendered, and
wherein processor operation to construct a bounding volume further includes constructing an axis-aligned bounding box for the screen space tile, the axis-aligned bounding box having a minimum bound and a maximum bound in the time dimension which are defined as a function of the camera space trajectory of the primitive.

18. The system of claim 17, wherein processor operation to construct a bounding volume further includes:
mapping each of a plurality of vertices of the primitive from camera space to dual space in which each vertex is represented as a vertex line, whereby a plurality of vertex lines are generated;
forming a plurality of bounding lines which limit the vertex lines over a portion of the dual space; and
computing the minimum and maximum bounds in the time dimension as a function of the bounding lines.

19. The system of claim 16,
wherein processor operation to construct a trajectory further includes constructing the trajectory of the primitive in screen space of the image which is to be rendered, and
wherein processor operation to construct a bounding volume further includes constructing an axis-aligned bounding box for the screen space tile, the axis-aligned bounding box having a minimum bound and maximum bound in a lens dimension (u,v) which are defined as a function of the screen space trajectory of the primitive.

20. The system of claim 19, wherein processor operation to construct a trajectory further includes:
   determining first and second screen space positions of the primitive at respective first and second lens positions (u,v); and
   constructing a screen space trajectory extending between the first and second screen space positions of the primitive.

21. A computer program product, resident on a non-transitory computer-readable medium, and operable to store instructions for reducing the number of sample points tested for rendering a screen space tile of an image, the computer program product comprising:
   instruction code for constructing a trajectory for a primitive extending within an image which is to be rendered;
   instruction code for determining low and high bounds in a non-screen space dimension for the screen space tile of the image which is to be rendered by using points of the trajectory of the primitive;
   instruction code for constructing a bounding volume for the screen space tile of the image which is to be rendered by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile; and
   instruction code for excluding from testing, one or more sample points which are located within the screen space tile, and which are not overlapped by the bounding volume.

22. A computer program product, resident on a non-transitory computer-readable medium, and operable to store instructions for rendering a screen space tile of an image, the screen space tile including a plurality of sample points distributed thereover, the computer program product comprising:
   instruction code for identifying a screen space tile which is to be rendered;
   instruction code for constructing a trajectory for a primitive in the screen space tile;
   instruction code for determining low and high bounds in a non-screen space dimension for the screen space tile by using points of the trajectory of the primitive;
   instruction code for constructing a bounding volume for the screen space tile by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile;
   instruction code for excluding from testing, one or more sample points which are located within the screen space tile, and which are not overlapped by the bounding volume;
   instruction code for testing the sample points which are located within the screen space tile and which are overlapped by the bounding volume; and
   instruction code for rendering the screen space tile of the image based upon the tested sample points.

* * * * *